Patented July 30, 1935

2,009,530

UNITED STATES PATENT OFFICE 2,009,530

ANTIOXIDANT

Arthur W. Sloan, Akron, Ohio, assignor to The B. F. Goodrich Company, New York, N. Y., a corporation of New York No Drawing. Application May 26, 1933, Serial No. 673,117

10 Claims. (Cl. 18—50)

This invention relates to the art of preserving rubber, fatty oils, petroleum products, synthetic plastics, and like organic materials against unduly rapid deterioration due to oxidation and the like.

This invention, in brief, consists in treating the rubber or other like organic material with a member of a class of compounds which may be designated as diamino diaryl alkanes, in which the two aryl groups are attached to different carbon atoms of an aliphatic nucleus. They have the general structural formula

A—R—X—R'—A' wherein A and A' represent amino groups, X represents an aliphatic nucleus, and R and R' represent aromatic nuclei attached to different carbon atoms of the nucleus X. The amino groups A and A' may be either primary, secondary, or tertiary and may contain any hydrocarbon substituents such as alkyl, aryl or aralkyl groups.

For example, the following compounds are typical members of the class of anti-oxidants described above: p,p' diamino dibenzyl; p,p' di(methylamino) dibenzyl; p,p' di(ethylamino) dibenzyl; p,p' di(butylamino) dibenzyl; p,p' di(benzylamino) dibenzyl; p,p' dianilino dibenzyl; p,p' di(p-tolylamino) dibenzyl; p,p' di(naphthylamino) dibenzyl; p,p' diamino diphenyl 1,2 propane; p,p' diamino diphenyl 1,3 propane; p,p' diamino diphenyl 1,3 isobutane; p,p' diamino di-o-tolyl 1,2 ethane; diamino dinaphthyl 1,2 ethane; as well as the corresponding compounds substituted in the ortho, meta or other positions. Any of the above-enumerated compounds may be used with good effect to retard the deterioration of rubber and other like organic substances, preferably in moderately small proportions, say from 0.1 to 5 per cent.

As a specific example of one embodiment of the invention of this application, a rubber composition is prepared containing blended plantation rubber 100 parts by weight, sulphur 5.5 parts, zinc oxide 30 parts, gas black 40 parts, mineral rubber 10 parts, palm oil 5 parts, and hexamethylene tetramine 0.75 parts. One portion of this composition is used as a control, while another portion is further mixed with 0.96 parts by weight (0.5% of the composition) of p,p' diamino dibenzyl. After vulcanization in a press for 45 minutes at 294° F. to produce an optimum cure, it is found that the composition containing the anti-oxidant deteriorates only approximately one-half as fast as the control composition when subjected to an accelerated aging test such as the Geer oven test.

It is to be understood that the term "treating" is employed in the appended claims in a generic sense to include either the incorporation of the anti-oxidants into the rubber or the like by mixing them into the said material while it is in a plastic or fluid condition, or by applying them to the surface of a solid mass thereof as a paste, powder or solution. The term "rubber" is likewise employed in the claims in a generic sense to include caoutchouc, both natural and synthetic, balata, gutta percha, rubber isomers and like products, whether or not admixed with fillers, pigments, or vulcanizing or accelerating agents.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

This application is a continuation in part of my co-pending application Serial No. 301,423 filed August 22, 1928.

I claim:

1. The method of preserving rubber which comprises treating rubber with a substance having the general formula

A—R—X—R'—A'

wherein A and A' represent amino groups which may contain hydrocarbon substituents, X represents an aliphatic nucleus, and R and R' represent aromatic nuclei attached to different carbon atoms of the nucleus X.

2. The method of preserving rubber which comprises treating rubber with a substance having the general formula

A—R—X—R'—A'

wherein A and A' represent primary amino groups, X represents an aliphatic nucleus, and R and R' represent aromatic nuclei attached to different carbon atoms of the nucleus X.

3. The method of preserving rubber which comprises treating rubber with p,p' diamino dibenzyl.

4. The method of preserving rubber which comprises treating rubber with a substance having the general formula

A—R—X—R'—A'

wherein A and A' represent secondary hydrocarbon substituted amino groups, X represents an aliphatic nucleus, and R and R' represent aromatic nuclei attached to different carbon atoms of the nucleus X.

5. The method of preserving rubber which comprises treating rubber with p,p' dianilino dibenzyl.

6. A composition comprising rubber and a substance having the general formula

A—R—X—R'—A' wherein A and A' represent amino groups which may contain hydrocarbon substituents, X represents an aliphatic nucleus, and R and R' represent aromatic nuclei attached to different carbon atoms of the nucleus X.

7. A composition comprising rubber and a substance having the general formula

A—R—X—R'—A' wherein A and A' represent primary amino groups, X represents an aliphatic nucleus, and R and R' represent aromatic nuclei attached to different carbon atoms of the nucleus X.

8. A composition comprising rubber and p,p' diamino dibenzyl.

9. A composition comprising rubber and a substance having the general formula

A—R—X—R'—A' wherein A and A' represent secondary hydrocarbon-substituted amino groups, X represents an aliphatic nucleus, and R and R' represent aromatic nuclei attached to different carbon atoms of the nucleus X.

10. A composition comprising rubber and p,p' dianilino dibenzyl.

ARTHUR W. SLOAN.